US007544017B2

(12) United States Patent
Keagy

(10) Patent No.: US 7,544,017 B2
(45) Date of Patent: Jun. 9, 2009

(54) PNEUMATIC SCULPTURE

(76) Inventor: Charles Wesley Keagy, 2140 E. Claiborne St., Springfield, MO (US) 65804

(*) Notice: Subject to any disclaimer, the term of this patent is extended or adjusted under 35 U.S.C. 154(b) by 291 days.

(21) Appl. No.: 11/590,630

(22) Filed: Oct. 31, 2006

(65) Prior Publication Data

US 2008/0098631 A1 May 1, 2008

(51) Int. Cl.
*B65G 51/34* (2006.01)

(52) U.S. Cl. ............................ 406/13; 406/30; 446/179

(58) Field of Classification Search .................. 406/13, 406/22, 30, 128; 443/176, 178, 179
See application file for complete search history.

(56) References Cited

U.S. PATENT DOCUMENTS

| | | | | |
|---|---|---|---|---|
| 2,003,257 | A * | 5/1935 | Fageol et al. | 406/112 |
| 2,890,537 | A * | 6/1959 | Benko | 40/412 |
| 3,224,771 | A | 12/1965 | Altieri | |
| 3,469,340 | A * | 9/1969 | Breneman et al. | 446/197 |
| 3,643,953 | A * | 2/1972 | Fixler | 273/119 B |
| 3,697,071 | A * | 10/1972 | Anderson | 463/60 |
| 3,711,038 | A * | 1/1973 | Van Otteren | 406/19 |
| 4,091,562 | A | 5/1978 | Kimura | |
| 4,209,935 | A | 7/1980 | Parker | |
| 4,250,657 | A * | 2/1981 | Barlow et al. | 446/178 |
| 4,283,053 | A | 8/1981 | Parker et al. | |
| 4,458,602 | A | 7/1984 | Vandersteel | |
| 4,725,256 | A * | 2/1988 | Sassak | 446/176 |
| 5,522,756 | A * | 6/1996 | Barthold | 446/193 |
| 6,264,202 | B1 | 7/2001 | Briggs | |
| 6,499,409 | B1 | 12/2002 | Neiderer et al. | |
| 6,722,887 | B2 * | 4/2004 | Polonio | 434/237 |

FOREIGN PATENT DOCUMENTS

EP 0 271 365 A2 6/1988

* cited by examiner

*Primary Examiner*—Douglas A Hess
(74) *Attorney, Agent, or Firm*—Rose Alyssa Keagy

(57) ABSTRACT

A pneumatic sculpture 10 includes a display tube 30 having a first end 40 and a second end 50. The pneumatic sculpture 10 also includes one or more projectiles 20 contained within the display tube 30. The projectile 20 is capable of being propelled through the display tube 30 from a location proximate to the first end 40 to a location proximate to the second end 50, and thereafter from a location proximate to the second end 50 to a location proximate to the first end 40, thereby traveling in one direction or in both directions. Lastly, the pneumatic sculpture 10 includes a pneumatic means 60 coupled to the first and second ends 40, 50 of the display tube 30 for controlling the speed and direction of the projectile 20 through the display tube 30.

30 Claims, 13 Drawing Sheets

PNEUMATIC SCULPTURE

BACKGROUND OF THE INVENTION

This invention relates to an apparatus for moving one or more projectiles by pneumatic air flow through one or more display tubes.

DETAILED DESCRIPTION OF THE INVENTION

Figure 1:
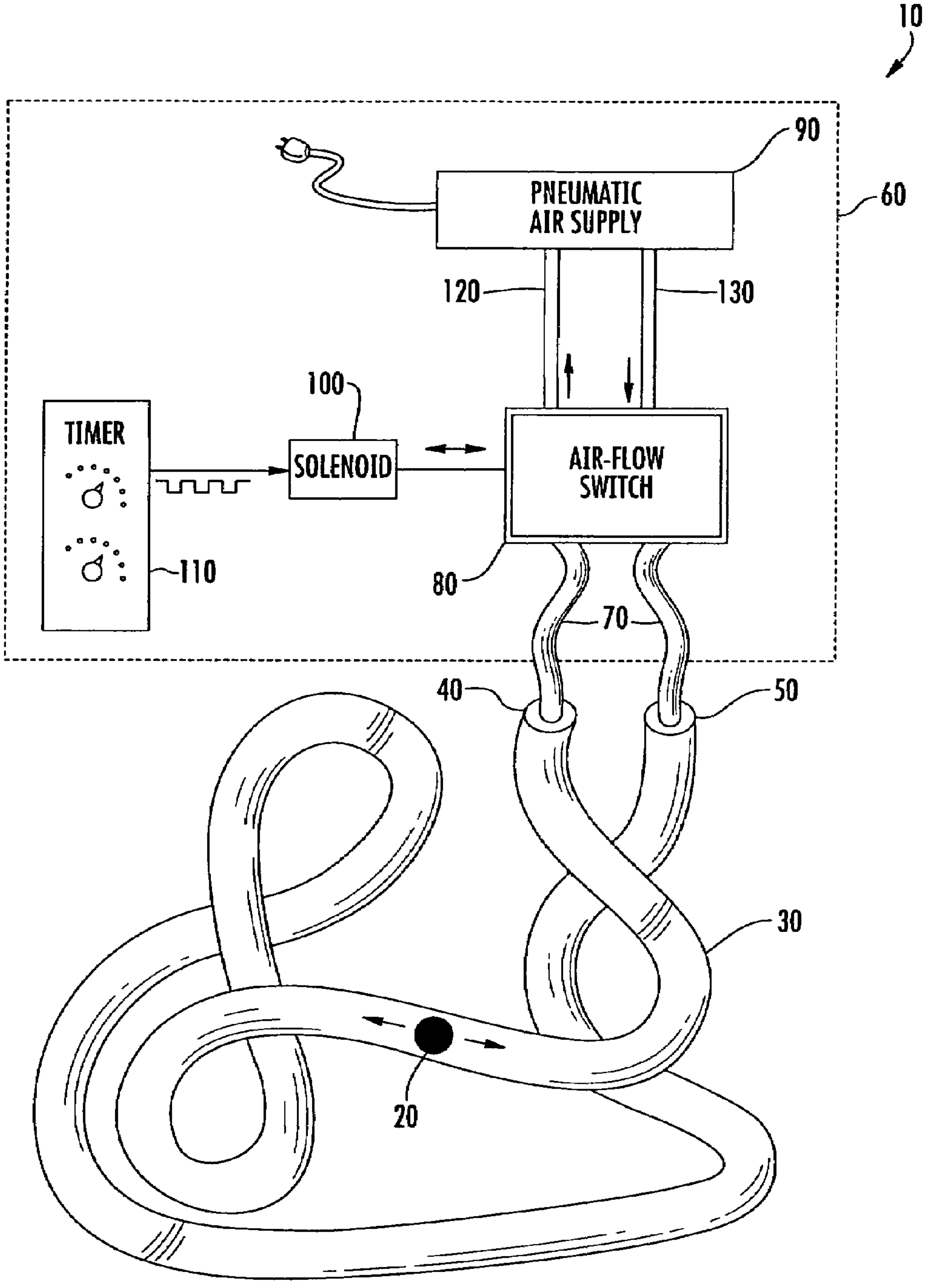
FIG. 1 is a schematic illustration of a pneumatic sculpture in accordance with the invention.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Referring to the drawings, FIG. 1 is a schematic illustration of a pneumatic sculpture 10 in accordance with the present invention. In the example configuration, a projectile 20 travels through a display tube 30 back and forth between a first end 40 and a second end 50 to create an animated pneumatic sculpture.

The display tube 30 is comprised of any material that allows the movement of the projectile 20 to be observed. In the example configuration the display tube 30 is a plastic tubular material that is clear or transparent. The example display tube 30 has an inside diameter of 0.750 inches, an outside diameter of 1.125 inches, and a durometer of 70-85 duro (available through Hudson Extrusions, of Hudson, Ohio).

However, it is within the scope of the invention to use a display tube 30 that is comprised of any material that has good visual attributes. In addition, the clear display tube 30 may be stable in the presence of ultra violet light, allowing the projectiles 20 to be coated with a material that glows when ultra violet light is directed onto the pneumatic sculpture 10.

The projectile 20 is comprised of any material that will not make the projectile 20 too heavy to be pulled by vacuum or pushed by air pressure through the display tube 30. In addition, the projectile 20 is formed in any suitable shape that provides sufficient clearance with the inside diameter of the display tube; thereby allowing easy travel of the projectile throughout the display tube (including travel around any bends or loops of the display tube). Preferably, the outside diameter of the projectile 20 is 75-95% of the inside diameter of the display tube 30. Optimally the outside diameter of the projectile 20 is 80-85% of the inside diameter of the display tube 30. In the example configuration, the projectile 20 is a brightly colored light weight plastic ball having a diameter of 0.635 inches (available from a hobby store). However, it is within the scope of the invention for the projectile 20 to be comprised of other suitable materials such as rubber, balsa wood, or Styrofoam. In addition, the projectile 20 may be any suitable shape; such as a ball, an oval, or a rod. Furthermore, the projectile 20 may be solid or hollow. Moreover, the projectile may emit light (such as a projectile that has a clear shell and an internal light source connected to a watch battery).

As shown in FIG. 1, the pneumatic sculpture 10 includes a pneumatic air flow system 60 that controls the propulsion of the projectile 20 through the display tube 30. In the example configuration, the pneumatic air flow system 60 is connected to the display tube 30 by control hoses 70 that are located at the first end 40 and the second end 50 of the display hose 30. The pneumatic air flow system 60 provides pressurized air to one end of the display tube 30 and simultaneously provides air suction to the opposite end of the display tube 30. It is within the scope of the invention to use any air flow system 60 that is capable of providing a sufficient volume of pressurized air and vacuum to the display tube 30.

Figure 2:
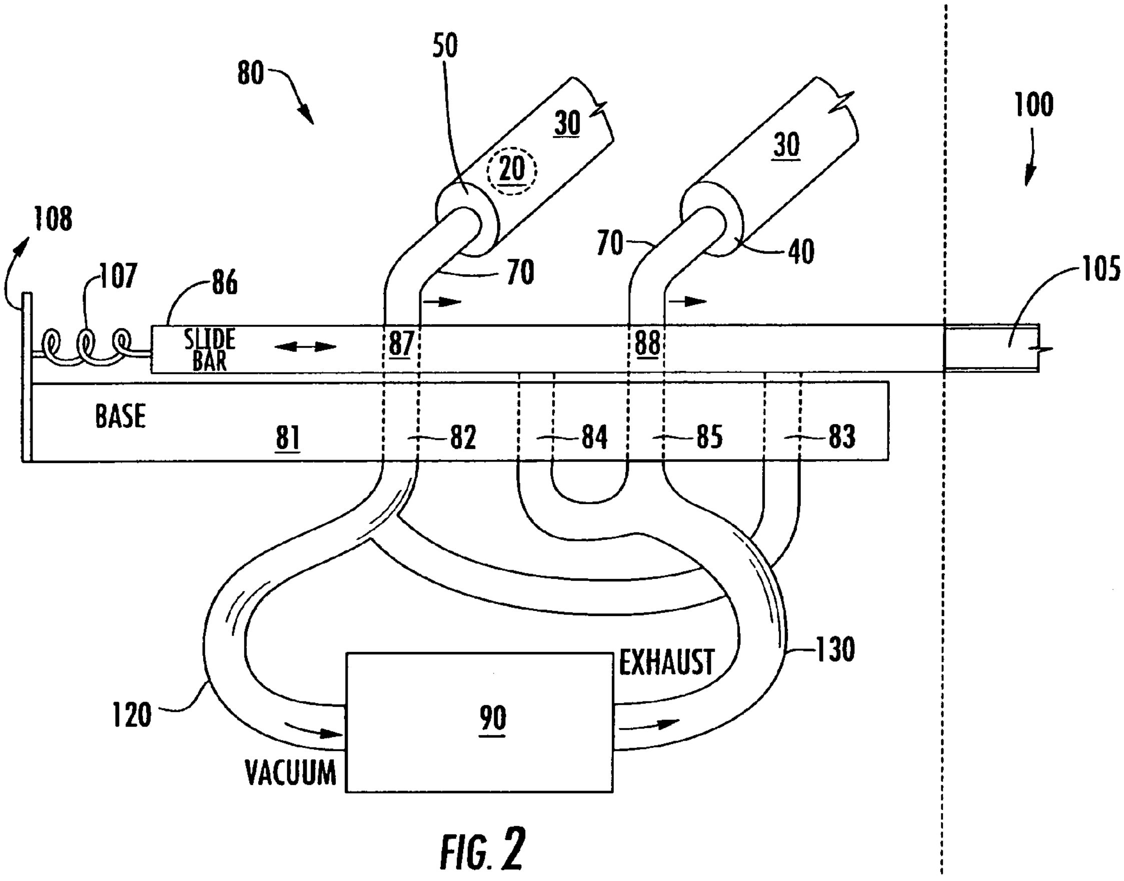
FIG. 2 is a schematic illustration of the air flow switch and a portion of the solenoid in accordance with the invention.

In the example configuration, the pneumatic air flow system 60 includes an air flow switch 80 that is coupled between the control hoses 70 and an air supply 90. The air flow switch 80 controls the flow of pressurized air and vacuum between the air supply 90 and the control hoses 70, as shown in FIG. 2 and discussed infra. The example air supply 90 is a vacuum pump. The vacuum pump 90 is a MOA series oilless diaphragm vacuum pump (available from Idex Corp of Benton Harbor, Mich. or Grainger Co. of Springfield, Mo.).

The pneumatic air flow system 60 also includes a solenoid 100 that is coupled to the air flow switch 80 and is controlled by a repeating timer 110. In the example configuration, the solenoid 100 is a single coil solenoid with a spring return that runs on a 120 volt a.c. supply and has a 1 inch stroke; such as the model 14-1 by Dormeyer® that can be purchased in an electrical supply store. The repeating timer is a model 1A367M by Dayton® that can be purchased in an electrical supply store. Alternatively, the timer could be a computer (that may simultaneously control other aspects of the pneumatic sculpture 10 such as the lighting or the movement of the sculpture).

During operation, the pneumatic air flow system 60 supplies suction to one end of the display tube 30 by connecting the inlet side 120 of the vacuum 90 to the end of the display tube 30 selected by the air flow switch 80. Simultaneously, the example pneumatic air flow system 60 supplies pressurized air to the opposite end of the display tube 30 by connecting the exhaust side 130 of vacuum 90 to the other end of the display tube 30. For example, pressurized air may be initially supplied to a first end 40 of the display tube 30 while suction is supplied to the second end 50 of the display tube 30. This causes the projectile 20 to be propelled through the display tube 30 from a location that is proximate to the first end of the display tube 40 towards a location that is proximate to the second end of the display tube 50. Next, the air flow switch 80 may direct pressurized air to a second end 50 of the display tube 30 and suction to the first end 40 of the display tube 30, thereby causing the projectile 20 to be propelled (in the reverse direction) through the display tube 30 from a location that is proximate to the second end of the display tube 50 back to a location that is proximate to the first end of the display tube 40. Therefore, the air flow switch 80 continues to cause the projectile 20 to move back and forth between the first end 40 and the second end 50 of the display tube 30 during the operation of the pneumatic sculpture 10 by switching the vacuum between the first end 40 and the second end 50 of the display tube while simultaneously applying pressurized air to the opposite end of the display tube 30.

The time delay used by the air flow switch 80 when alternating the application of vacuum and air pressure is provided by the repeating timer 110. Specifically, the repeating timer 110 is set to send a signal to the solenoid 100 at the conclusion of every delay period. The suitable time delay is determined by the overall length of the display tube 30 (the tube length dictating how long it takes the projectile 20 to travel from one end of the display tube 30 to the opposite end of the display tube 30). During operation, the timer 110 sends an electrical signal to the solenoid 100 to direct the solenoid 100 to retract or relax the armature connected to the return spring (therein providing the mechanical force that moves the slide bar of the air flow switch 80, as described in more detail infra).

FIG. 2 is a schematic illustration of the air flow switch 80 and a portion of the solenoid 100 in an example configuration. However, it is within the scope of the invention to use any suitable commercially available air flow switch instead of the example air flow switch 80. In the example configuration shown in FIG. 2, the air flow switch 80 has a base 81 that is held stationary by any suitable means. The base 81 has two ports 82, 83 that funnel the vacuum, and two ports 84, 85 that funnel the pressurized air (e.g. exhaust). Above the base 81 is a slide bar 86 that moves across the surface of base 81 in response to the combined movement of a solenoid armature 105 that is on one side of the slide bar 86 and a pull-back spring 107 that is on the opposite side of the slide bar 86. The pull-back spring 107 is attached to a fixed location, such as plate 108 attached to the side of the base 81. The slide bar 86 has a port 87 that is connected to the control hose 70 of the second end 50 of the display tube. In addition, the slide bar 86 has a port 88 that is connected to the control hose 70 of the first end 40 of the display tube. Therefore, if the slide bar 86 is in the position shown in FIG. 2 then a vacuum is applied to the second end 50 and pressurized air is supplied to the first end 40 of the display tube 30 (causing the projectile to move from the first end 40 to the second end 50). When the armature 105 ‘picks’ and the slide bar 86 moves to the right of the position shown in FIG. 2 then a vacuum will be applied through port 88 to the first end 40 and pressurized air will be supplied through port 87 to the second end 50 of the display tube 30 (causing the projectile to move from the second end 50 to the first end 40). As a result, the movement of the slide bar back and forth will result in a corresponding movement of the projectile 20 back and forth through the display tube 30.

Figure 3:
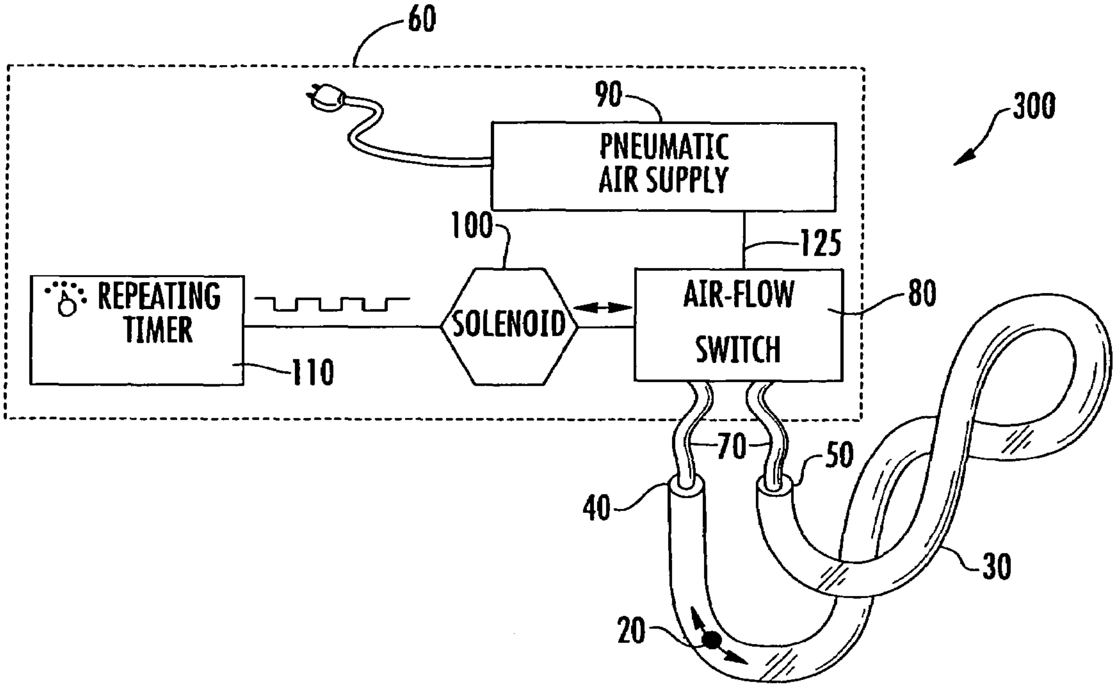
FIG. 3 is a schematic illustration of a pneumatic sculpture in accordance with an alternative embodiment of the invention.

FIG. 3 is a schematic illustration of a pneumatic sculpture 300 in accordance with an alternative embodiment the present invention. The alternative pneumatic sculpture 300 is similar to the pneumatic sculpture 10 of FIG. 1, except the projectile 20 is propelled through the display tube 30 by air pressure alone or air suction alone. Therefore, in this alternative configuration the air flow switch is connected to only one end 125 of the pump 90. If the air flow switch 80 is connected to the inlet of the vacuum pump 90 then an inflow of outside air is directed by the air flow switch to the opposite end of the display tube. Conversely, if the air flow switch 80 is connected to the exhaust of the vacuum pump 90 then air will flow out of the opposite end of the display tube and be directed by the air flow switch to the outside of the sculpture 300.

Figure 4:
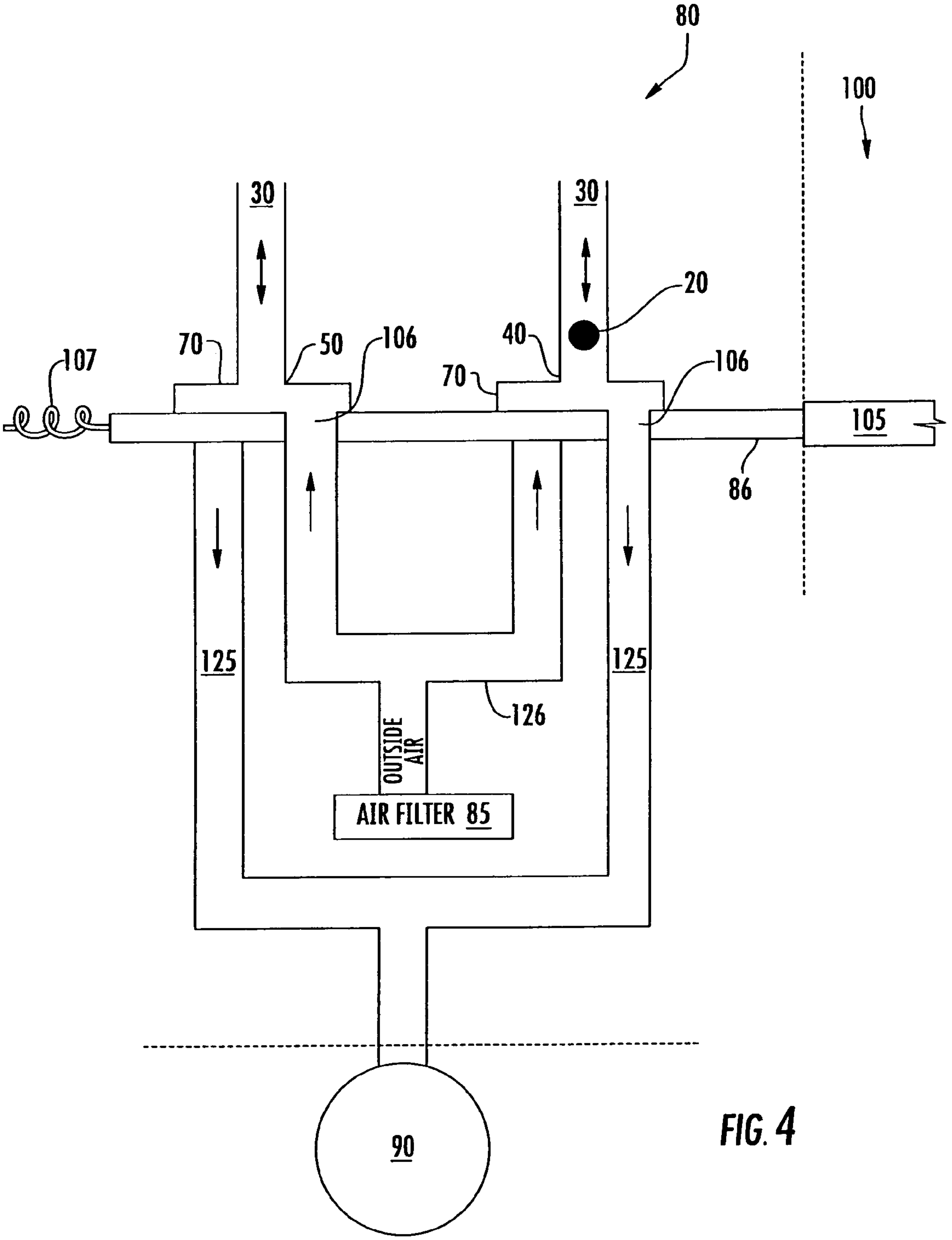
FIG. 4 is a schematic illustration of the air flow switch and a portion of the solenoid in accordance with the alternative embodiment of the invention shown in FIG. 3.
Figure 5:
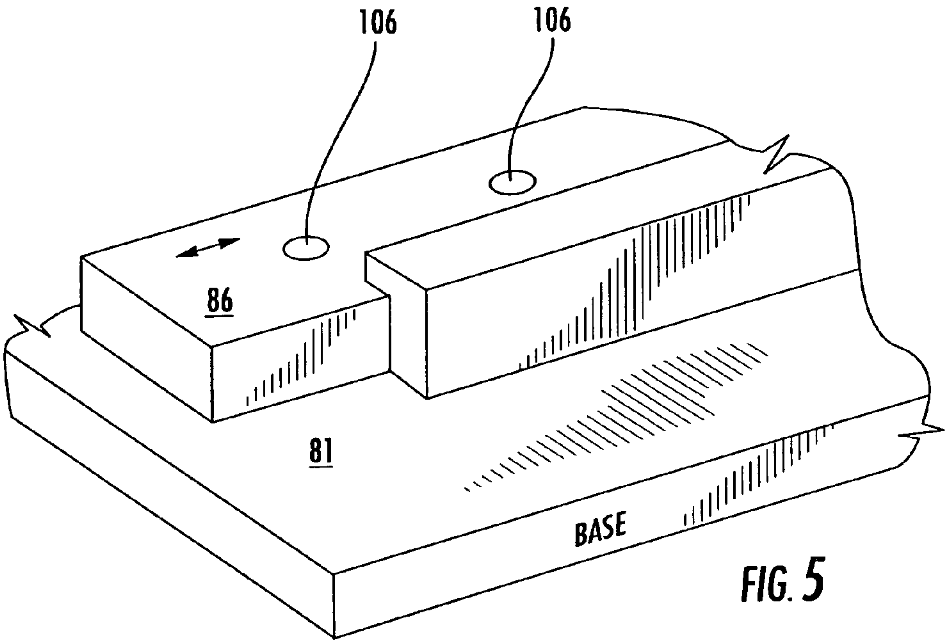
FIG. 5 is an angled view of a portion of an example slide bar of the air flow switch shown in FIG. 4.

For example, as shown in FIG. 4, when the hose 125 is connected between the inlet (vacuum) port of the vacuum pump 90 and the air flow switch 80 then a vacuum (suction) will be applied to the first end 40 of the display tube when the slide bar 86 is in the position shown. At the same time, the air flow switch 80 will provide an inflow of outside air through hose 126 to the second end 50 of the display tube. Preferably, the air flow switch 80 pulls the outside air through an air filter 85 that is coupled to hose 126 to avoid contaminating the vacuum pump 90. This configuration causes the projectile 20 to be propelled through the display tube 30 from a location proximate to the second end 50 of the display tube to a location proximate to the first end 40 of the display tube. After a pre-selected time delay, the timer 110 will send an electrical signal to the solenoid 100. In response to that signal, the armature 105 of solenoid 100 relaxes and the pull-back spring 107 will move the slide bar 86 to the left, causing the ports 106 to simultaneously pass outside air to the first end 40 and vacuum to the second end 50. This configuration causes the projectile 20 to be propelled through the display tube 30 from a location proximate to the first end 40 of the display tube towards a location proximate to the second end 50 of the display tube. It is to be noted that the ports 106 may simply be holes that are drilled through the slide bar 86, as shown in FIG. 5.

The pneumatic sculpture 300 works in a similar manner when the hose 125 of FIG. 3 is connected between the outlet (exhaust) port of the vacuum pump 90 and the air flow switch 80. In that configuration, a flow of air (air pressure) will be applied to the first end 40 of the display tube when the slide bar 86 is in the position shown in FIG. 4. At the same time, the air flow switch 80 will exhaust the air from the second end 50 of the display tube to the outside through hose 126. This activity causes the projectile 20 to be propelled through the display tube 30 from a location proximate to the first end 40 of the display tube to a location proximate to the second end 50 of the display tube. After a pre-selected time delay, the timer 110 will send an electrical signal to the solenoid 100. In response to that signal, the armature 105 of the solenoid will move the slide bar 86 to the left of the position shown in FIG. 4, causing the ports 106 to simultaneously exhaust the air from the first end 40 and push air into the second end 50. This causes the projectile 20 to be propelled through the display tube 30 from a location proximate to the second end 50 of the display tube towards a location proximate to the first end 40 of the display tube. As a result, the movement of the slide bar back and forth will result in a corresponding movement of the projectile 20 back and forth through the display tube 30. It is to be noted that solenoids have force in one direction only. Therefore, a restoring force such as a spring (or gravity) is needed to restore the solenoid to the starting (de-energized) position before the next operation.

Figure 6:
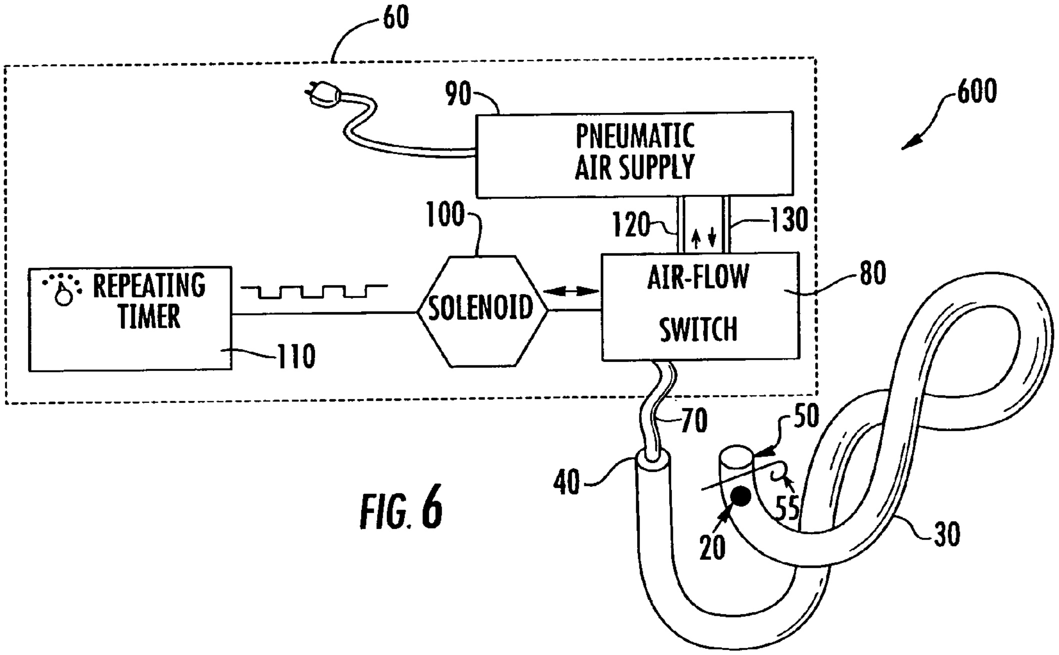
FIG. 6 is a schematic illustration of a pneumatic sculpture in accordance with another alternative embodiment of the invention.
Figure 7:
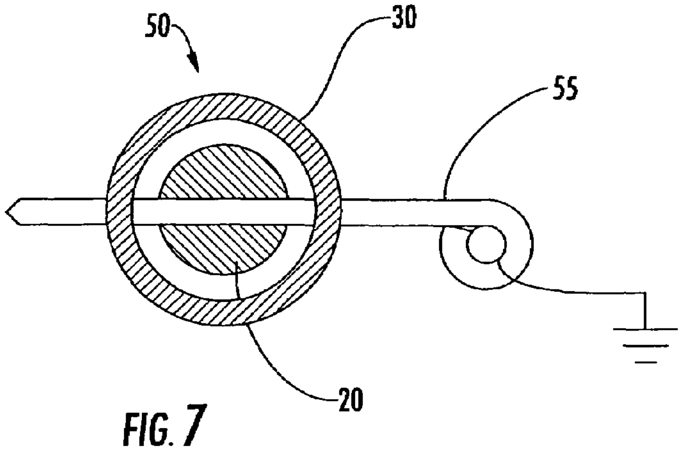
FIG. 7 is a side view of the second end of the display tube shown in FIG. 6.

FIG. 6 is a schematic illustration of a pneumatic sculpture 600 in accordance with another alternative embodiment the present invention. The alternative pneumatic sculpture 600 is similar to the pneumatic sculpture 10 of FIG. 1, except the projectile 20 is propelled through the display tube 30 by alternating the supply of air pressure and air suction to only a first end 40 of the display tube 30. Another difference between the alternative pneumatic sculpture 600 and the pneumatic sculpture 10 is that the second end 50 is not connected to the air flow switch 80. Instead, the second end is left open. (However, in an alternative configuration the second end 50 could be attached to a 50 micron air filter, such as filter 85 of FIG. 4.) The second end 50 of the display tube is modified to contain the projectile 20 when the projectile is proximate to the second end 50 of the display tube 30. In the example configuration, a stop pin 55 is inserted through the second end 50 of the display tube 30, as shown in further detail in FIG. 7. The stop pin 55 prevents the projectile 20 from exiting the display tube 30. In addition, the stop pin 55 is comprised of a material, such as copper, that allows it to be electrically grounded to facilitate the removal of unwanted static electricity from both the display tube 30 (caused by the frictional movement of the projectile 20 through the display tube 30) and the projectile 20.

Figure 8:
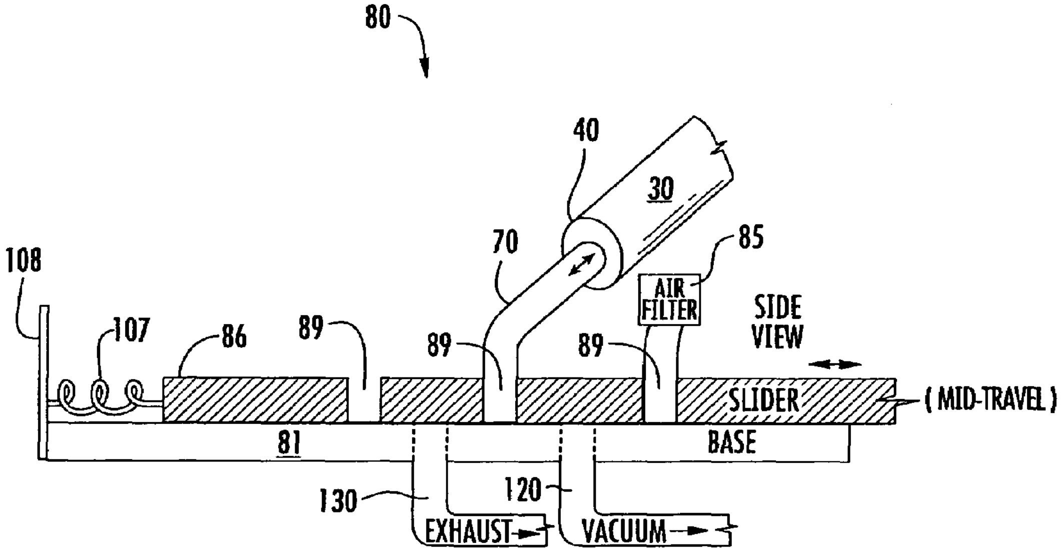
FIG. 8 is a schematic illustration of the air flow switch in accordance with the alternative embodiment of the invention shown in FIG. 6.

In operation, as shown in FIG. 8, the slide bar 86 moves one direction (i.e. right of the position shown in FIG. 8), causing the vacuum pump inlet 120 to supply a vacuum through port 89 and control hose 70 to the first end 40 of the display tube. As the vacuum is applied to the display tube 30, the projectile 20 will travel towards the first end 40 until it presses against the first end 40 or until the air flow changes direction. When the timer 110 sends an electrical signal to the solenoid 100 to allow the spring 107 to move the slide bar 86 in the opposite direction (i.e. left of the position shown in FIG. 8), then the vacuum pump 90 will push air through the exhaust hose 130, through the port 89, and through the control hose 70 to the first end 40 of the display hose. As air pressure is applied to the first end 40 of the display tube 30, the projectile 20 will travel towards the second end 50 until it presses against the stop pin 55 or until the air flow changes direction again. Therefore, the projectile 20 will move back and forth through the display tube 30 in response to the application of vacuum or air pressure to only the first end 40. It is to be noted that in the example configuration that an outside air filter 85 is coupled through port 89 to the inlet side of the pump when it is not connected to the display tube 30 to enable the pump to draw only filtered outside air.

Figure 9:
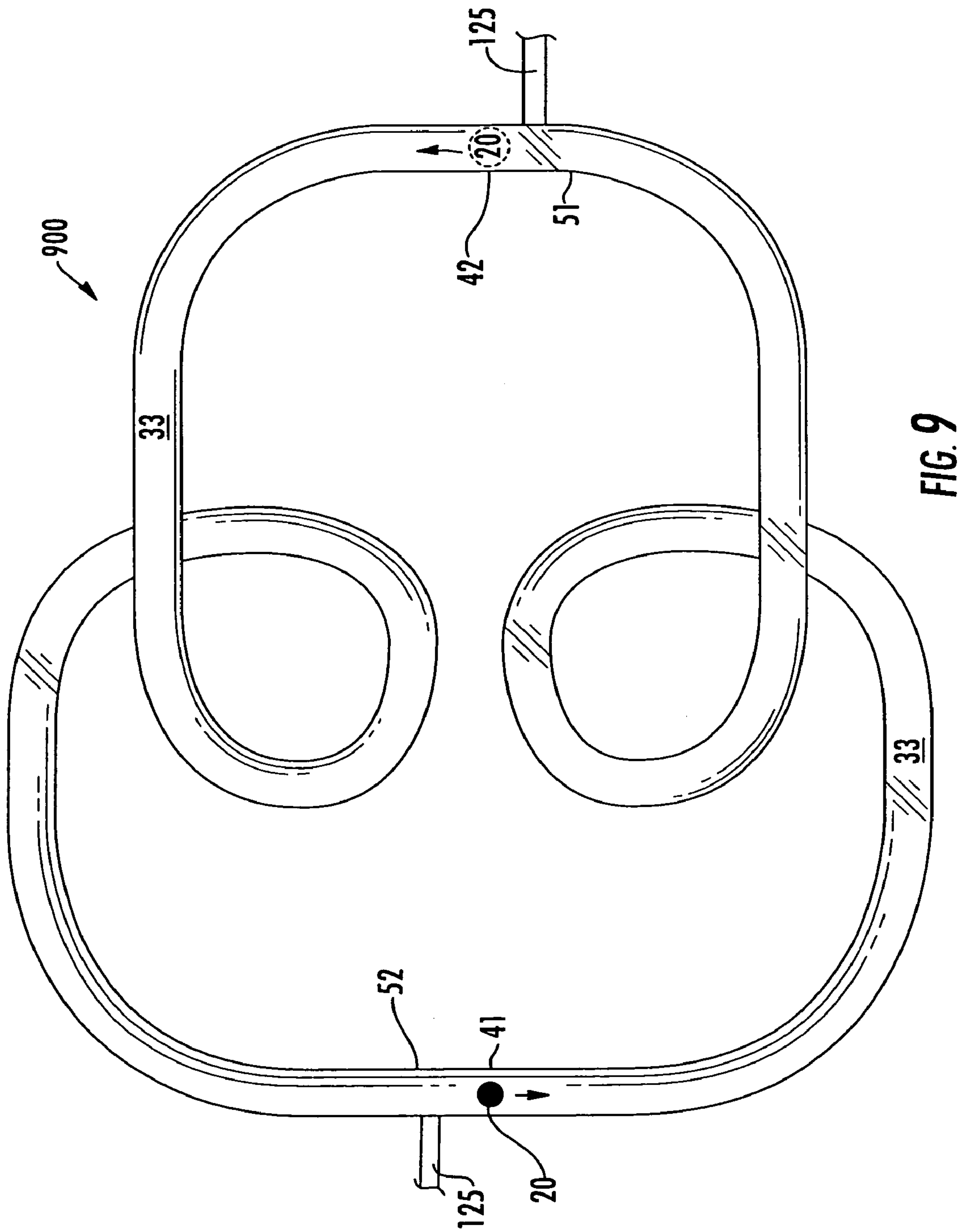
FIG. 9 is a schematic illustration of a pneumatic sculpture in accordance with another alternative embodiment of the invention.

FIG. 9 is a schematic illustration of a pneumatic sculpture 900 in accordance with an alternative embodiment the present invention. The alternative pneumatic sculpture 900 is similar to the pneumatic sculpture 300 except the display tube 33 is in a closed loop configuration and the projectile 20 travels only in one direction.

For example, the projectile 20 may start at a location in the display tube 33 that is proximate to the first end 41 and then be propelled to the second end 51 by either vacuum or air pressure that is applied through one or more hoses 125 that are attached to the display tube 33. Thereafter, the projectile 20 may continue to travel in the same direction through the display tube 33 from a first end 42 to a second end 52. Therefore, the projectile 20 will continue to travel in a continuous loop through display tube 33. It is to be noted that a hose 125 may need to be shut off when the projectile travels over that hose to avoid hindering the movement of the projectile 20 over the interface between the hose and the display tube 33.

Figure 10:
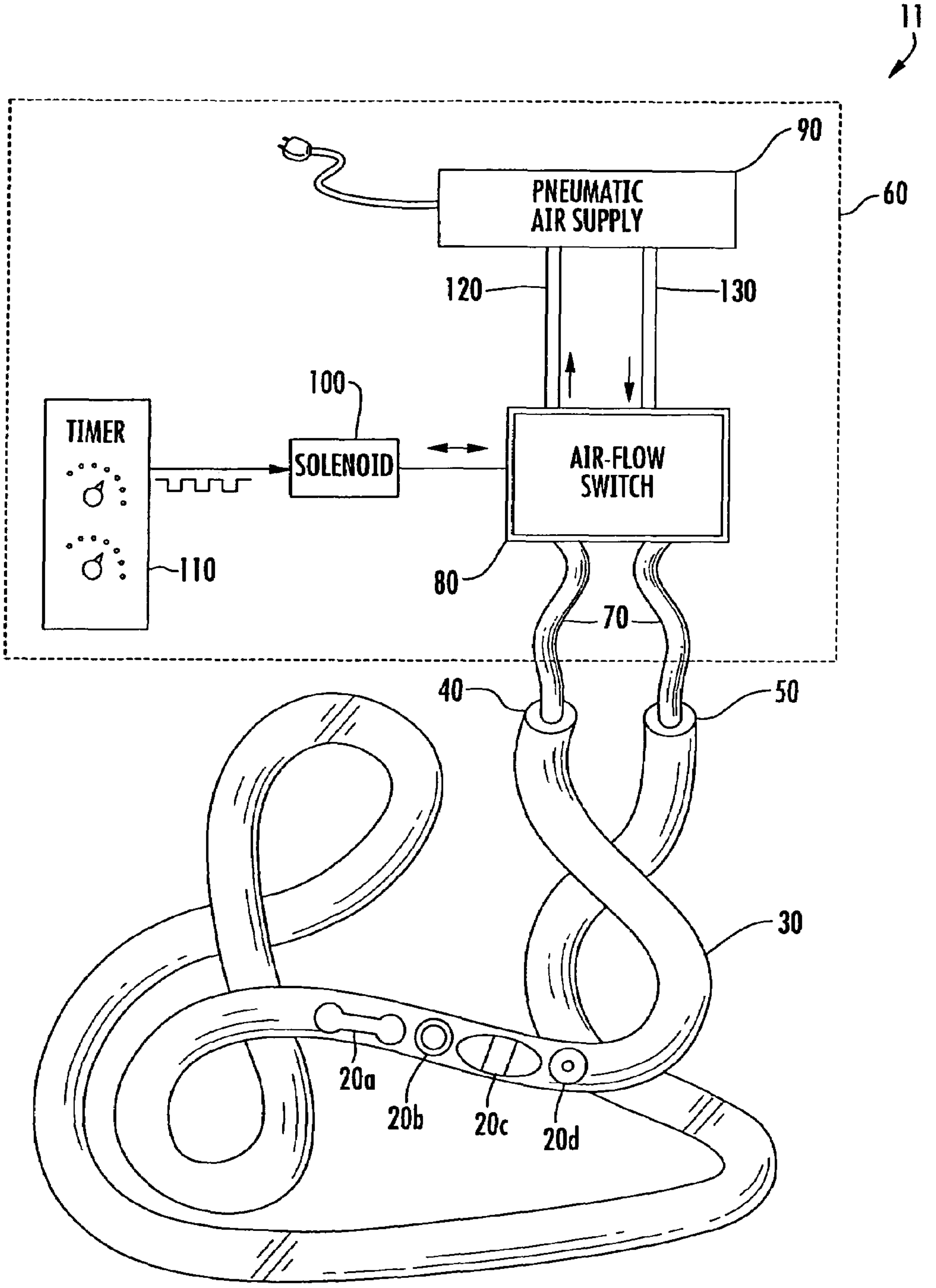
FIG. 10 is a schematic illustration of the pneumatic sculpture of FIG. 1 that is modified to incorporate multiple projectiles in accordance with another embodiment of the invention.

It is within the scope of the invention to incorporate multiple projectiles 20 within any of the pneumatic sculptures 10, 300, 600, 900. In addition, the projectiles 20 may have different shapes and colors within the pneumatic sculpture. For example, the pneumatic sculpture 10 of FIG. 1 could be modified, as shown in FIG. 10, to contain multiple projectiles 20*a*, 20*b*, 20*c*, 20*d*,having different shapes, colors, or markings that travel somewhat together between the first end 40 and the second end 50 of the display tube 30. It is to be noted that a projectile having a long shape (such as 20*a* of FIG. 10) will need sufficient flexibility to successfully bend around the curves within the display tube 30.

Figure 11:
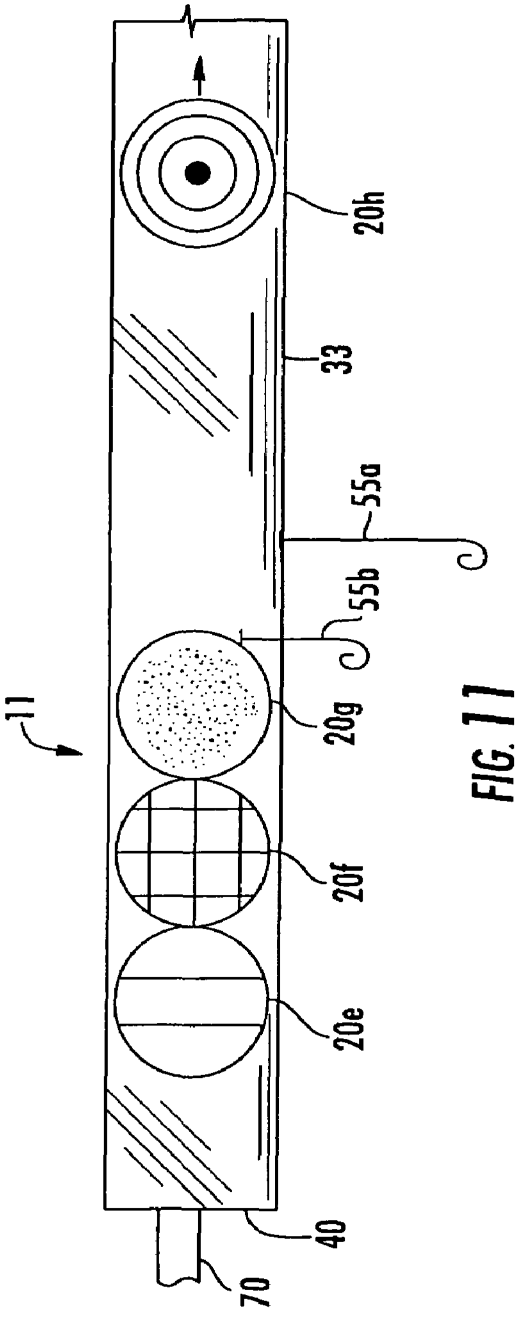
FIGS. 11 and 12 are a schematic illustration of a portion of the pneumatic sculpture of FIG. 10 in accordance with another embodiment of the invention.
Figure 12:
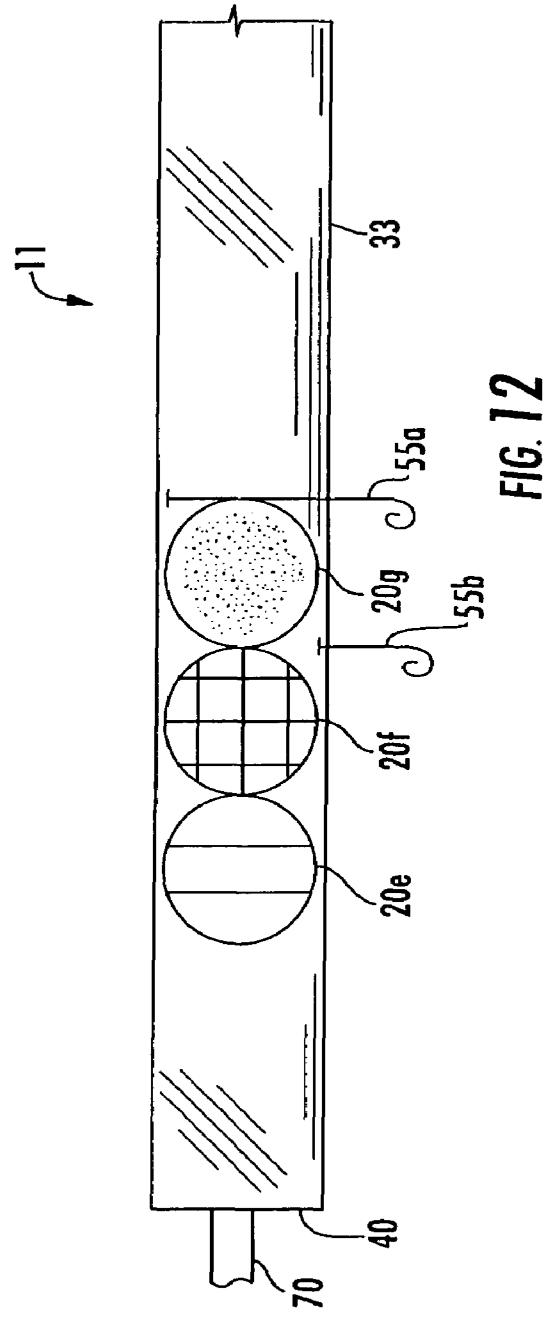

Alternatively, the pneumatic sculpture 11 of FIG. 10 could be configured to release only one of a set of projectiles so that any projectile traveling throughout the display tube 30 is different than the one that the observer saw previously or sees subsequently. Therein the color or shapes of the observed traveling projectile changes while viewing the pneumatic sculpture 11. There are many sculpture modifications that may accomplish this feature. For example, as shown in FIG. 11, a solenoid-controlled stop pin 55*b* could retain the stacked projectiles 20*e*, 20*f*, and 20*g*, while stop pin 55*a* (that is controlled by another solenoid) releases the front projectile 20*h*. Then, as shown in FIG. 12, the stop pin 55*a* is reinserted into the display tube 30 and the stop pin 55*b* contracts; thereby permitting the movement of the stacked projectiles 20*e*, 20*f*, and 20*g* against the stop pin 55*a*. When stop pin 55*b* is reinserted into the display tube 30 between projectiles 20*f* and 20*g* (not shown) then stop pin 55*a* is once again able to release one projectile (i.e. 20*g*) into the display tube 30.

Figure 13:
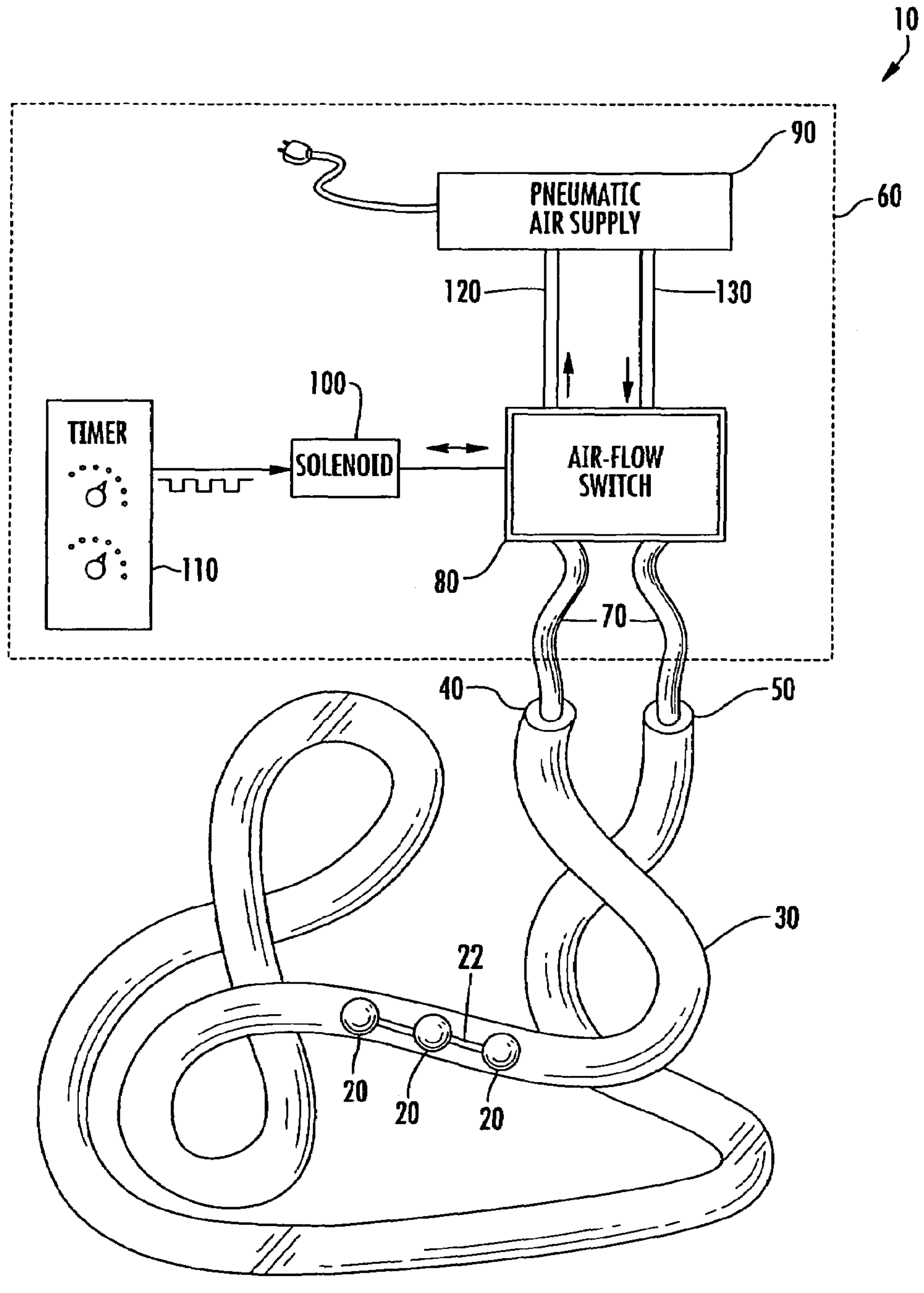
FIG. 13 is a schematic illustration of a pneumatic sculpture in accordance with another alternative embodiment of the invention.

Various additional modifications to the invention as described above are within the scope of the claimed invention. For example, photo sensors or pressure sensors could be used to detect the presence of the projectiles at the ends 40, 50 of the display tube, thereby eliminating the need for the repeating timer 110. In addition, the speed that the projectile or projectiles move may be altered during the course of travel throughout the display tube or tubes by controlling the output capacity of the air supply (such as through the use of a dimmer switch to reduce the power provided to the air supply or by changing the diameter of the control hose feeding the display tube or tubes). Alternatively, the air flow from the air supply could be repeatedly started and stopped, causing the projectiles to move through the display tube in a pulsed fashion. Moreover, if more than one projectile is used, they may be coupled together by any suitable means, such as with a length of sponge rubber 22 as shown in FIG. 13. The use of projectiles that are coupled together, as shown in FIG. 13, may improve the visibility of the movement of the projectiles throughout the pneumatic sculpture.

Another modification within the scope of the invention is the use of a pneumatic solenoid valve to route both pressurized air and vacuum from the air supply 90 directly to the first and second ends of the display tube 30. This alternative configuration would eliminate the need for the air flow switch 80 and the control hoses 70 described above.

Figure 14:
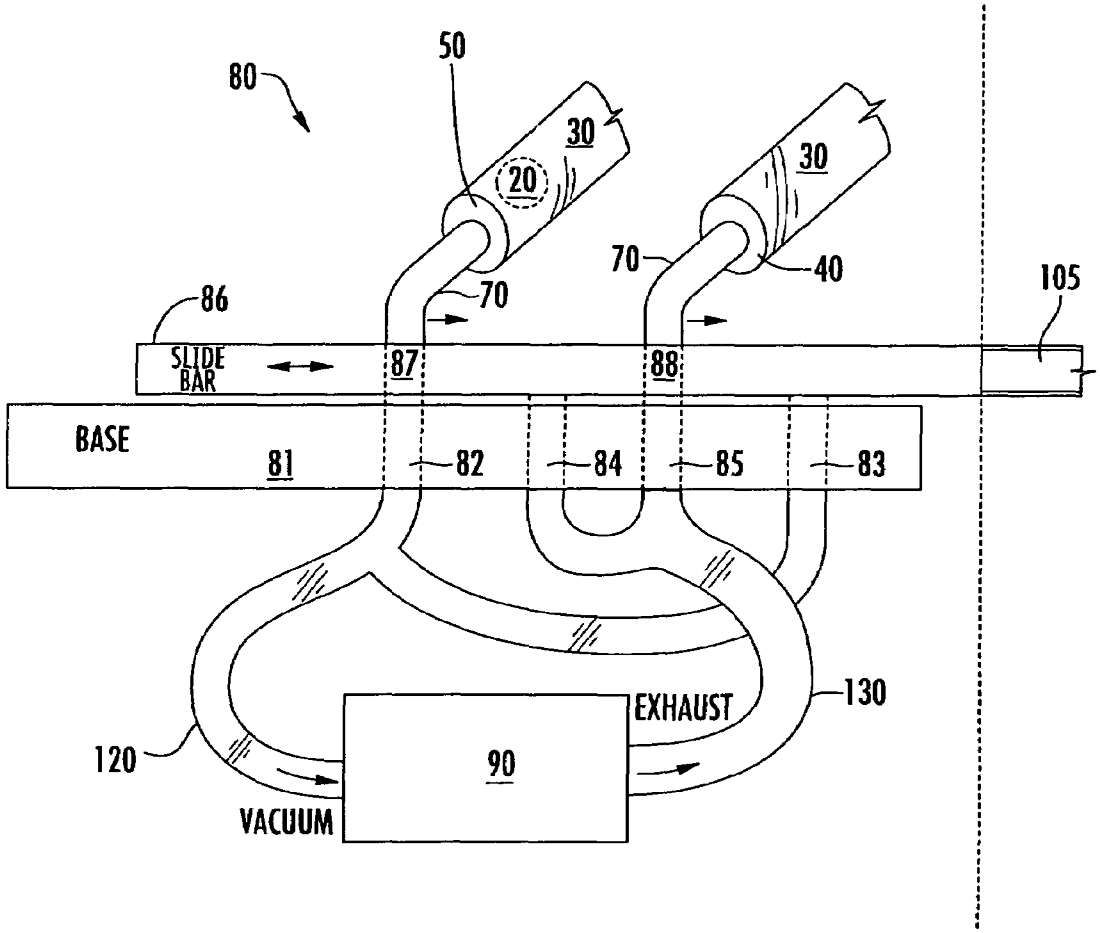
FIG. 14 is a schematic illustration of the air flow switch in accordance with an alternative embodiment of the invention.

Other changes to the pneumatic air flow system 60 are also within the scope of the invention. For example, instead of using a single coil solenoid, a double coil solenoid may be used. As shown in FIG. 14, the pull-back spring that was used in conjunction with a single coil solenoid can be eliminated with the double coil configuration. In the double coil configuration, the common armature 105 moves the slide bar 86 back and forth, therein directing the flow of air between the vacuum pump 90 and the first and second ends 40, 50 of the display tube.

Figure 15:
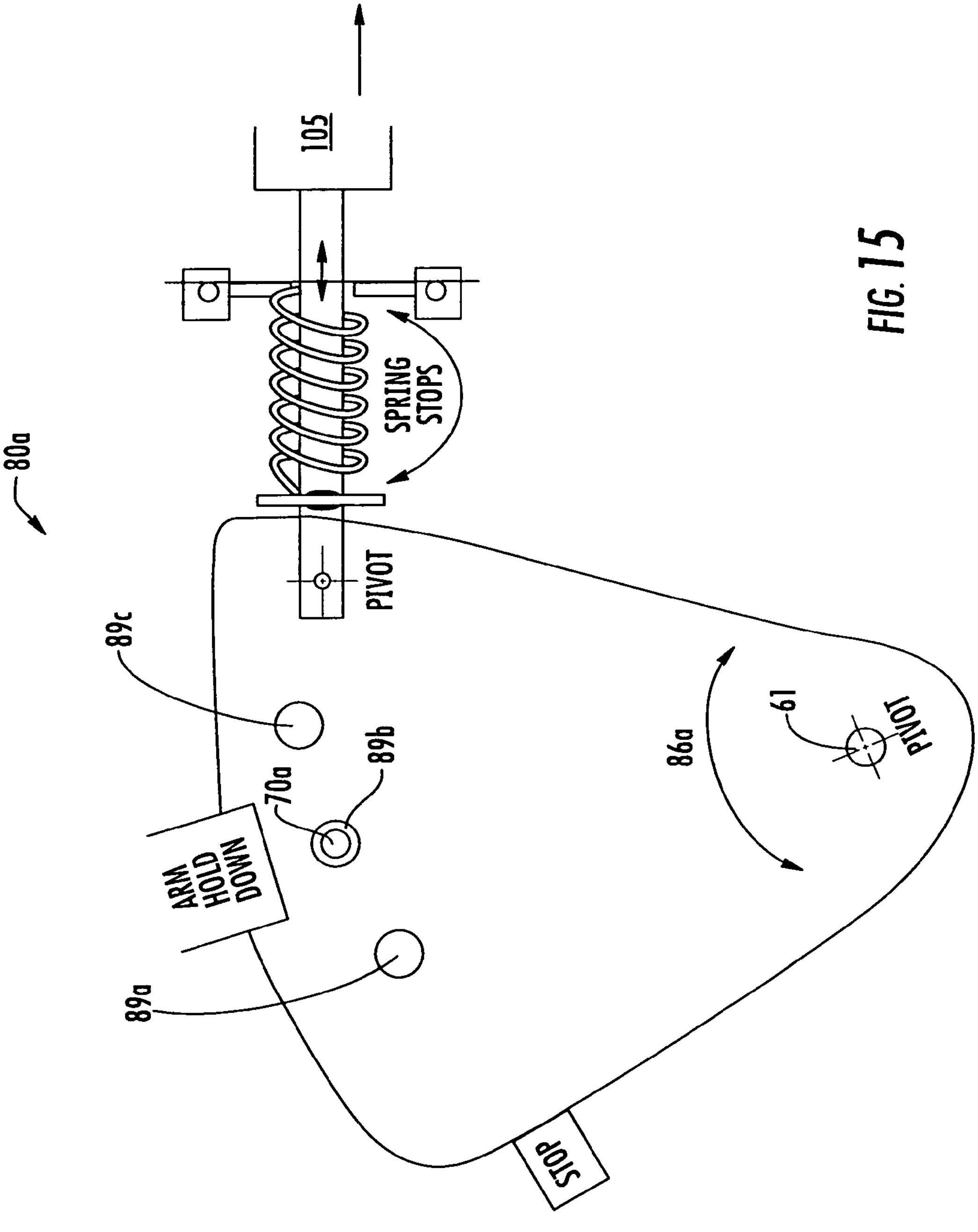
FIG. 15 is a schematic illustration of the airflow switch in accordance with another alternative embodiment of the invention.

Another change to the pneumatic airflow system 60 is the use of a pivoting arm 86*a* instead the slide bar 86, as shown in FIG. 15. The example air flow switch configuration 80*a* of FIG. 15 performs substantially the same way as the air flow switch 80 of FIG. 8. The main difference is that the slide bar 86 of FIG. 8 moves in a straight back and forth motion, whereas the pivoting arm 86*a* of FIG. 15 moves in an arc motion around pivot point 61. With port 89*a* connected to the exhaust hose 130, the port 89*b* connected to the vacuum pump inlet 120 (thereby providing suction to the control hose 70*a* when the pivoting arm 86*a* is in the position shown in FIG. 15), and port 89*c* providing a path to the outside, the one or more projectiles 20 can be propelled through a display tube 30 as desired.

Figure 16:
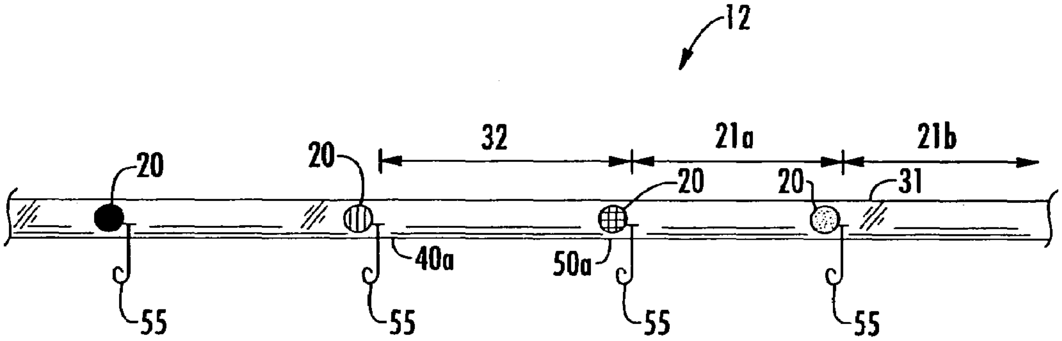
FIG. 16 is schematic illustration of a portion of a pneumatic sculpture in accordance with another embodiment of the invention.

The stop pins 55 (shown in FIGS. 6-7) may be used in any location of the pneumatic sculpture where an electrical ground is advantageous. In addition, stop pins 55 (as shown in FIGS. 11-12) may be used in any location of the pneumatic sculpture where the visual effect is changed by containing or by holding and subsequently re-releasing projectiles at different locations throughout the pneumatic sculpture 12, as shown in FIG. 16. The portion of an example pneumatic sculpture shown in FIG. 16 is a relatively long display tube 31. Therefore, it may be desirable to place stop pins 55 at selected intervals 32 of the display tube 31 in order to contain one or more projectiles 20. The stop pins are used to create multiple first and second ends 40*a*, 50*a*, thereby restricting the travel of the one or more projectiles 20 to a back and forth movement within an interval 32 of the display tube 31. Alternatively the stop pins may be used to hold and re-release one or more projectiles 20, thereby causing a projectile to travel from one interval 21*a* to the subsequent interval 21*b*.

The pneumatic sculpture of the present invention may be displayed in many different ways. For example, it could rest on a floor, be mounted to a wall, or suspended from the ceiling. Therefore, basketballs could fly through display tubes mounted to the walls of an arena during a basketball game, or baseballs could fly through display tubes mounted to the ceiling of a sports bar. Furthermore, a clear or transparent panel could be formed having molded tunnels of the appropriate diameter for movement of the projectiles throughout the panel; thereby eliminating the need for the display tubes. Moreover, an ultra high vacuum could facilitate the transport of large containers through large tunnels (possibly to carry materials or equipment through harsh conditions—over or under land, or through bodies of water).

In any configuration, the noise generated by the pneumatic air flow system could be reduced by enclosing the pneumatic air flow system 60 within a shroud or by moving it to a location outside the room that contains the pneumatic sculpture. In addition, whether resting on a floor, or mounted to a wall or ceiling, the sculpture could be attached to a platform that rotates—thereby rotating the sculpture in any direction and at any speed. Furthermore, mirrors or other shinny surfaces could be placed at locations around or within the sculpture to enhance the visual display. (For example, the display tube 30 could pass back and forth through a mirror such that both the movement of the projectile and the mirror's reflected movement of the projectile is observed.) Moreover, more than one display tube, of possibly more than one display tube diameter, may be intertwined to create the final pneumatic sculpture.

Figure 17:
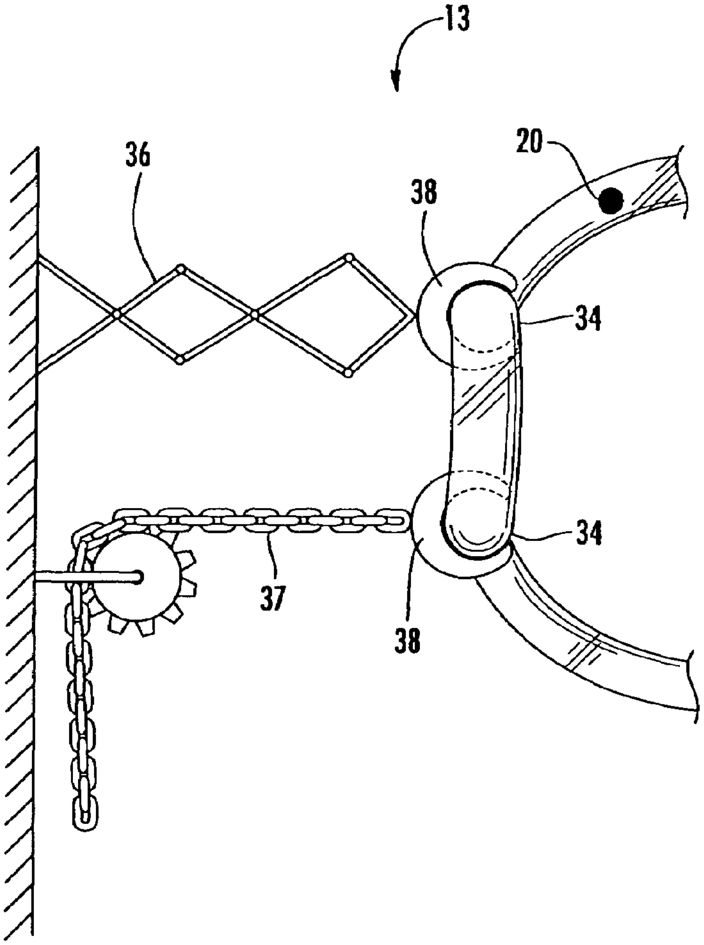
FIG. 17 is schematic illustration of a portion of a pneumatic sculpture in accordance with another embodiment of the invention.

Because the pneumatic sculpture of the present invention contains flexible display tubes, the overall size or shape of the pneumatic sculpture may be dynamically changed by mechanical means while the projectile or projectiles are propelled through the display tube or tubes. As shown in the example configuration shown in FIG. 17, a variety of means may be used to move the display tube or tubes 34, therein affecting the overall physical shape or position of the tubes 34 of the pneumatic sculpture 13. In the example shown in FIG. 17, the display tube 34 is dynamically displaced using a scissor arm 36 and a pull chain 37 to change the position of the clear (butyrate) brackets 38 that hold and move the display tube 34.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A pneumatic sculpture comprising:

a display tube, said display tube having a first end and a second end;

a projectile contained within said display tube, said projectile capable of being propelled through said display tube from a location proximate to said first end to a location proximate to said second end, and thereafter from a location proximate to said second end to a location proximate to said first end; and a pneumatic means coupled to said first and second ends of said display tube for providing a vacuum to one of said first and second ends of said display tube and simultaneously providing pressurized air to the other of said first and second ends of said display tube.

2. The pneumatic sculpture of claim 1 further comprising at least one additional projectile contained within said display tube.

3. The pneumatic sculpture of claim 2 wherein said at least one additional projectile is coupled to said projectile.

4. The pneumatic sculpture of claim 3 wherein said projectile and said additional projectile repeatedly travel between said location proximate to said first end to said location proximate to said second end, and thereafter from said location proximate to said second end to said location proximate to said first end in order to create an animated pneumatic sculpture.

5. The pneumatic sculpture of claim 2 wherein said projectile and said at least one additional projectile are held and re-released in at least one location that is between said first end and said second end of said display tube.

6. The pneumatic sculpture of claim 2 wherein said propulsion of said projectile and said at least one additional projectile are restricted to an interval of said display tube that is located between said first end and said second end of said display tube.

7. The pneumatic sculpture of claim 1 wherein said projectile repeatedly travels between said location proximate to said first end to said location proximate to said second end, and thereafter from said location proximate to said second end to said location proximate to said first end in order to create an animated pneumatic sculpture.

8. The pneumatic sculpture of claim 1 wherein said pneumatic means comprises:

a vacuum pump;

an air flow switch coupled to said vacuum pump to facilitate a direction of an air flow through said display tube;

a solenoid coupled to said air flow switch, said solenoid providing an input signal to said air flow switch that causes said air flow switch to change said direction of said air flow through said display tube; and a timer coupled to said solenoid for controlling a length of time between said input signals provided to said air flow switch.

9. The pneumatic sculpture of claim 1 wherein said pneumatic means changes a speed of said propulsion of said projectile through said display tube.

10. The pneumatic sculpture of claim 1 wherein said pneumatic means changes a direction of said propulsion of said projectile through said display tube.

11. The pneumatic sculpture of claim 1 wherein said pneumatic sculpture is adjustable to change size during a time when said projectile travels through said display tube.

12. The pneumatic sculpture of claim 1 wherein said pneumatic sculpture is adjustable to change shape during a time when said projectile travels through said display tube.

13. The pneumatic sculpture of claim 1 wherein an outside diameter of said projectile is approximately 80-85% smaller than an inside diameter of said display tube.

14. The pneumatic sculpture of claim 1 wherein said projectile is held and re-released in at least one location that is between said first end and said second end of said display tube.

15. The pneumatic sculpture of claim 1 wherein said propulsion of said projectile is restricted to an interval of said display tube that is located between said first end and said second end of said display tube.

16. A pneumatic sculpture comprising:

a closed loop display tube;

a projectile contained within said display tube, said projectile capable of being propelled in one direction throughout the length of said display tube; and at least one pneumatic means coupled to said display tube for providing both pressurized air and a vacuum to said display tube wherein said pneumatic sculpture is adjustable to change size during a time when said projectile travels through said display tube.

17. The pneumatic sculpture of claim 16 further comprising at least one additional projectile contained within said display tube.

18. The pneumatic sculpture of claim 17 wherein said at least one additional projectile is coupled to said projectile.

19. The pneumatic sculpture of claim 17 wherein said projectile and said at least one additional projectile are held and re-released in at least one location of said display tube.

20. The pneumatic sculpture of claim 17 wherein said propulsion of said projectile and said at least one additional projectile are restricted to an interval of said display tube.

21. The pneumatic sculpture of claim 16 wherein said at least one pneumatic means comprises:

a vacuum pump;

an air flow switch coupled to said vacuum pump to facilitate a direction of an air flow through said display tube;

a solenoid coupled to said air flow switch that provides an input signal to said air flow switch that causes said air flow switch to change said direction of said air flow through said display tube; and a timer coupled to said solenoid for adjusting a length of time between said input signals to said air flow switch that causes said air flow switch to change said direction of said air flow.

22. The pneumatic sculpture of claim 16 wherein said at least one pneumatic means changes a speed of said propulsion of said projectile through said display tube.

23. The pneumatic sculpture of claim 16 wherein said pneumatic sculpture is adjustable to change shape during a time when said projectile travels through said display tube.

24. The pneumatic sculpture of claim 16 wherein an outside diameter of said projectile is approximately 80-85% smaller than an inside diameter of said display tube.

25. The pneumatic sculpture of claim 16 wherein said pneumatic sculpture rotates during a time when said projectile travels through said display tube.

26. The pneumatic sculpture of claim 16 wherein said projectile is held and re-released in at least one location of said display tube.

27. The pneumatic sculpture of claim 16 wherein said propulsion of said projectile is restricted to an interval of said display tube.

28. A pneumatic sculpture comprising:

a display tube, said display tube having a first end and a second end;

a projectile contained within said display tube, said projectile capable of being propelled through said display tube from a location proximate to said first end to a location proximate to said second end, and thereafter from a location proximate to said second end to a location proximate to said first end;

at least one additional projectile contained within said display tube, said at least one additional projectile coupled to said projectile; and a pneumatic means coupled to said first end of said display tube for controlling said propulsion of said projectile through said display tube.

29. The pneumatic sculpture of claim 28 wherein said projectile and said additional projectile repeatedly travel between said location proximate to said first end to said location proximate to said second end, and thereafter from said location proximate to said second end to said location proximate to said first end in order to create an animated pneumatic sculpture.

30. The pneumatic sculpture of claim 28 wherein said pneumatic means comprises:

a vacuum pump;

an air flow switch coupled to said vacuum pump to facilitate a direction of an air flow through said display tube;

a solenoid coupled to said air flow switch, said solenoid providing an input signal to said air flow switch that causes said air flow switch to change said direction of said air flow through said display tube; and a timer coupled to said solenoid for controlling a length of cycle time between said input signals provided to said air flow switch.

* * * * *